United States Patent [19]

Pfenning et al.

[11] 4,174,925
[45] Nov. 20, 1979

[54] APPARATUS FOR EXCHANGING ENERGY BETWEEN HIGH AND LOW PRESSURE SYSTEMS

[75] Inventors: Dwight B. Pfenning, Oklahoma City; Lonnie C. Higginbottom, Midwest City, both of Okla.; Cedomir M. Sliepcevich, 2500 Butler Dr., Norman, Okla. 73069

[73] Assignee: Cedomir M. Sliepcevich, Norman, Okla.

[21] Appl. No.: 809,567

[22] Filed: Jun. 24, 1977

[51] Int. Cl.² .............................................. F04B 1/22
[52] U.S. Cl. .................................... 417/225; 91/492; 251/208
[58] Field of Search ............... 417/64, 339, 392, 225; 91/483, 492; 251/208

[56] References Cited

U.S. PATENT DOCUMENTS

| | | | |
|---|---|---|---|
| 2,572,950 | 10/1951 | Ridel | 251/208 |
| 3,431,747 | 3/1969 | Hashemi et al. | 417/64 X |
| 3,582,090 | 6/1971 | Lott | 137/864 X |
| 3,630,484 | 12/1971 | Taylor | 251/208 |
| 3,641,881 | 2/1972 | Hashemi | 417/225 X |
| 3,910,587 | 10/1975 | Loeffler et al. | 277/63 |

Primary Examiner—William R. Cline
Attorney, Agent, or Firm—William R. Laney

[57] ABSTRACT

An apparatus for exchanging pressure energy between a fluid having a high energy content as a result of pressurization, and a fluid having a relatively lower pressure. The apparatus includes a rotor which has a plurality of spaced tubes extended in substantially parallel array over a major portion of the rotor length, and each having a separatory member movably mounted therein for reciprocatory displacement in the respective tube. Each of the fluid conveying tubes has its opposite ends movably but sealingly received in recesses in; floating rotor seal plates. Each seal plate further includes an arcuate port which completes the opening formed by both the recess and port through the seal plate. The opposite side of each seal plate from that which contains the recesses into which the respective tubes extend bears sealingly against a fixed stator block. In the side thereof which faces and sealingly contacts the seal plate, each of the stator blocks has a pair of spaced arcuate fluid distribution ports each positioned to sequentially and periodically register with the arcuate ports of the adjacent seal plate during rotation of the rotor and seal plates. Each of the arcuate fluid distribution ports communicates with a generally cylindrical fluid passageway which opens from the opposite side of the respective stator block, and in conjunction with the communicating arcuate fluid distribution port, facilitates fluid passage through the stator block. A rotor drive mechanism is provided for rotating the rotor about a central longitudinal axis which extends centrally through the seal plates and the stator blocks.

24 Claims, 7 Drawing Figures

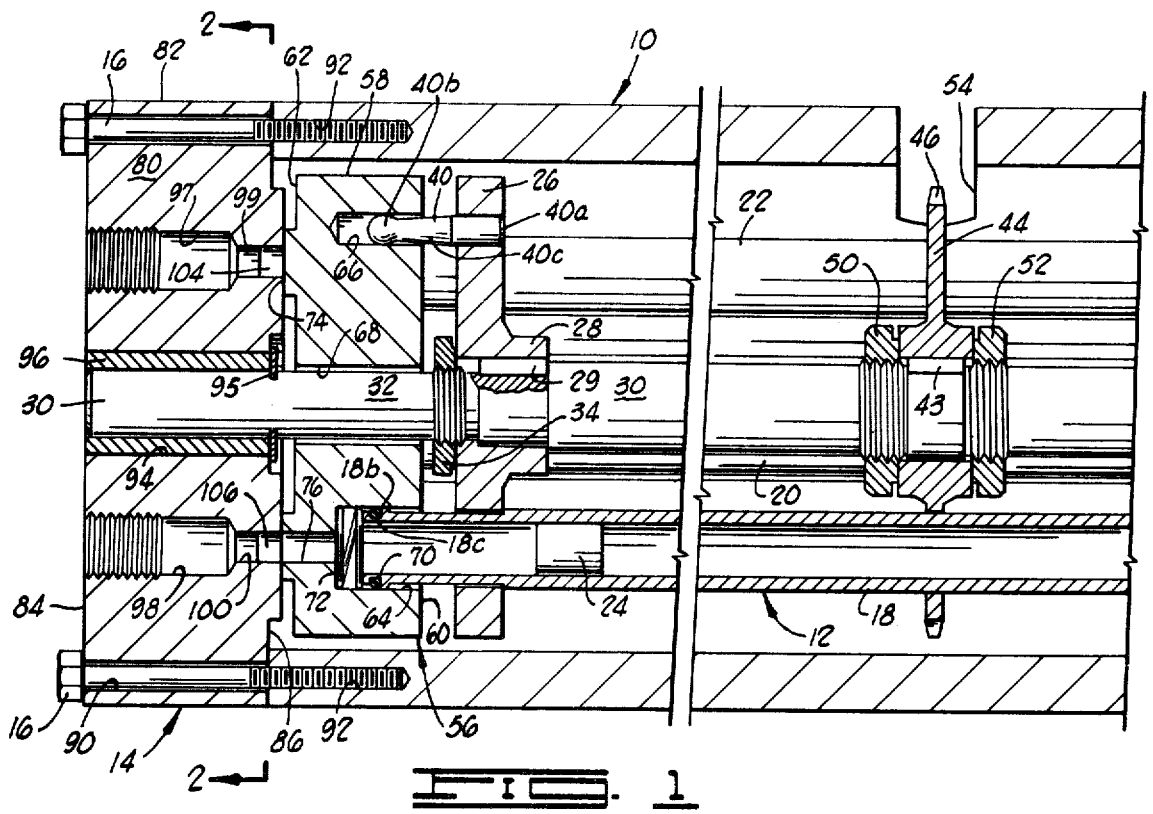
FIG. 1
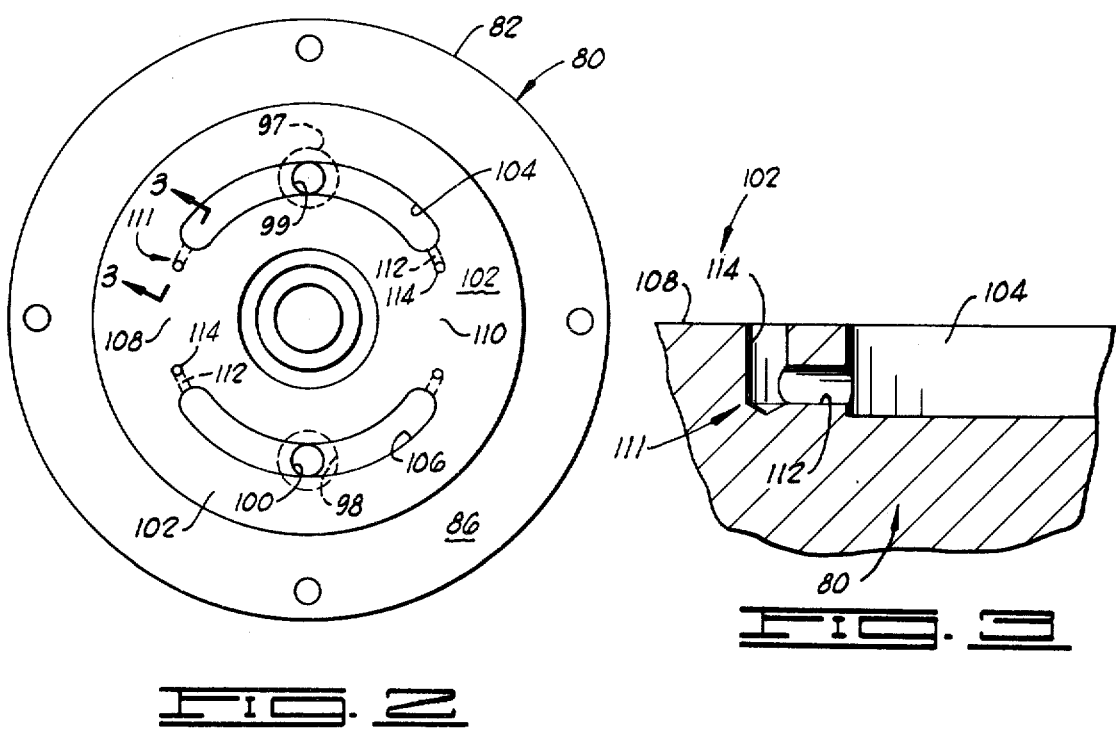
FIG. 2
FIG. 3

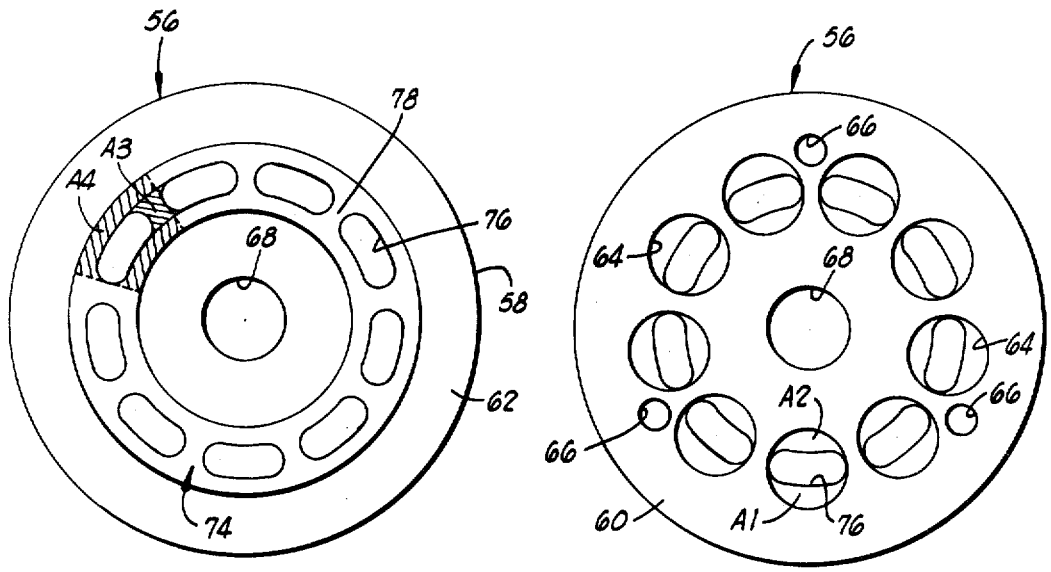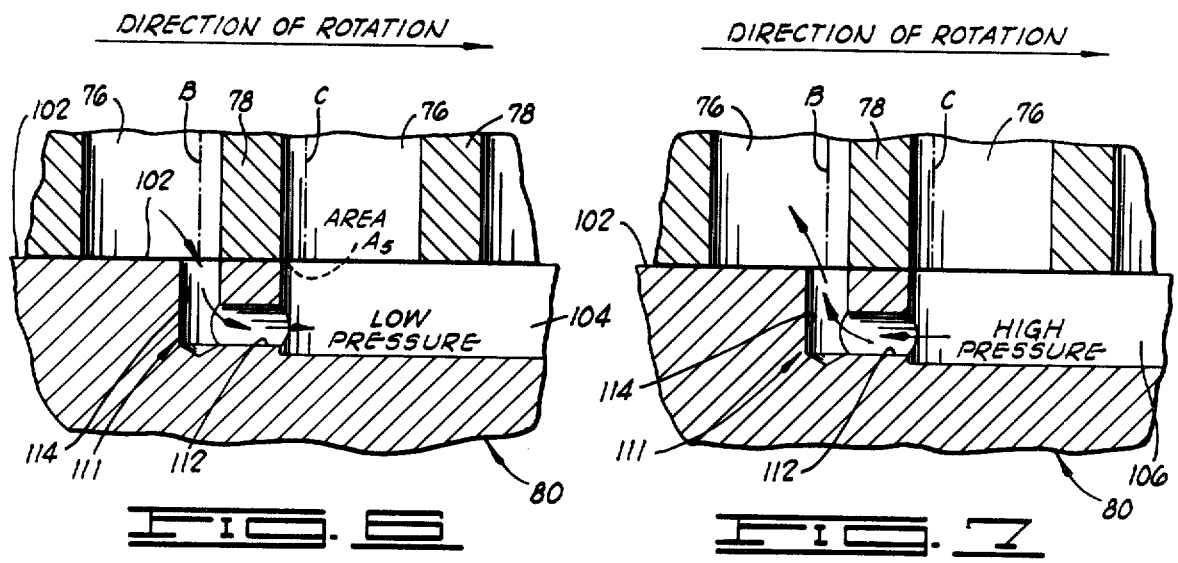

4,174,925

APPARATUS FOR EXCHANGING ENERGY BETWEEN HIGH AND LOW PRESSURE SYSTEMS

BACKGROUND OF THE INVENTION

1. Field of the Invention

This invention relates to devices which can be used for efficiently transferring pressure energy contained in one fluid under pressure to a second fluid at a lower pressure, so that the pressure of the first fluid is relieved and the pressure of the second fluid is increased with a minimal energy loss. More particularly, the present invention relates to an energy exchange engine which includes a rotor which alternately and sequentially, by rotation, places fluid passageways in the rotor thereof in alternating communication with sources of relatively high and relatively low pressure fluids conveyed to fluid passageways in the rotor through ported stator blocks disposed at opposite ends of the rotor.

2. Brief Description of the Prior Art

In some industrial processes, elevated fluid pressures are required only in certain parts of the operation to achieve desired results, following which the pressurized fluid is depressurized. In other processes, some fluids used in the process are available at high pressures and others at low pressures, and it is desirable to exchange pressure energy between those two fluids. In some applications, great improvement in economy of operation can be effected if pressure energy can be efficiently transferred between two liquids or between pumpable slurries of liquid-solid mixtures. A process of this type is the exchange crystallization or melting point inversion process of effecting desalination of sea water or brackish waters. A procedure of this type is that which is described in U.S. Pat. No. 3,431,747.

In the exchange crystallization process, a slurry of ice and hydrocarbon is placed under super-atmospheric pressure in order to reserve the order of freezing so that the ice crystals melt and the hydrocarbon is partially frozen. After this, the water derived from melting the ice is separated from the hydrocarbon, which is in the form of a slurry of solid hydrocarbon particles with the liquid hydrocarbon, and the separated phases are then depressurized to near atmospheric pressure. The procedure is operated cyclically and the economy with which the exchange crystallization-desalination process can be protected is directly dependent upon the efficiency with which the energy input to the process upon pressurization of the ice-hydrocarbon system can be recovered after separation of the water from the hydrocarbon and upon subsequent depressurization of the separated phases.

In U.S. Pat. No. 3,431,747 issued to Hadi T. Hashemi and Jerry L. Lott on Mar. 11, 1969, there is described a device or apparatus which permits pressure energy to be exchanged between relatively high and relatively low pressure fluid systems, and particularly, between liquids or between liquids and slurries which are at two different pressures. The apparatus permits a high percentage of the total energy of the pressurized liquid to be transferred to a liquid at lower pressure.

The apparatus described in U.S. Pat. No. 3,431,747 comprises a rotor assembly which moves during rotation against a stationary structure. The rotor assembly includes a cylindrical rotor body having a plurality of substantially parallel bores extending longitudinally of the body from one end thereof to the other. A freely movable separatory member is positioned in each of the bores and is movable along the bore and dimensioned to divide the bore into a pair of chambers. The cylindrical rotor body utilized in the described apparatus has a pair of opposed planar, substantially parallel end faces at which the bores through the rotor open in radially spaced, equidistant relation from a central rotational axis of the rotor.

The cylindrical rotor body is mounted in a surrounding rotor housing which is closed at its opposite ends by a pair of closure plates which receive a central shaft affixed to opposite end faces of the rotor, and which journal the shaft for rotational mounting of the rotor. Radially displaced in each of the closure plates from the projected axis of rotation of the rotor are a plurality of fluid passageways extending through the respective closure plates and communicating with bores formed through a seal plate interposed between each of the respective closure plates and a respective end face of the rotor. The seal plates are keyed to the adjacent closure plates and bear sealingly against the planar end faces of the rotor in a manner to facilitate intermittent and periodic communication between the ports formed through the seal plates and the elongated, parallel bores extending longitudinally through the rotor body.

In operation, a source of high pressure fluid is connected to one or more of the fluid passageways through one of the closure plates, and a source of low pressure fluid is connected to one or more of the other of the fluid passageways through the same closure plate. In the same way, a high pressure fluid source is connected to one or more passageways in the second closure plate located at the opposite end of the rotor assembly, and a low pressure fluid source is connected to one or more of the other fluid passageways therethrough. From the described structural relationship of the closure plates, seal plates and rotor, and more particularly, of the intermittent communication between the bores of the rotor and aligned ports through the seal plates, and the fluid passageways through the closure plates, it will be perceived that at such time as one of the rotor bores is aligned with a port in the seal plate, it receives or discharges either high or low pressure fluid, respectively, which acts upon the freely movable separatory member disposed in the respective bore. At the same time, the same bore through the rotor is aligned with a port in the seal plate at the other end of the rotor body, which port is, of course, in communication with one of the fluid passageways through the closure plate at that end of the assembly. There will thus be an introduction of fluid to the same bore in the rotor from the opposite end thereof so as to act upon the separatory member in that bore on the opposite side thereof from the side upon which fluid entering the bore from the opposite end of the rotor body acts.

By appropriately synchronizing the intermittent and periodic communications between each rotor bore with sources of high and low pressure as effected through the interpositioned seal plate ports and closure plate fluid passageways, the pressure energy can be caused to transfer via the movable separatory member in each of the bores in such a way as to increase the pressure of the relatively low pressure fluid in one end of the bore, while relieving and decreasing the pressure of the high pressure fluid in the other end of the bore.

Ease of displacement of the separatory member is characteristic of the structure, and the transfer of pressure energy is highly efficient due to the minimum energy requirement to displace these elements in their respective bores. Moreover, the system does not employ conventional valving which can become choked or clogged by any entrained material carried in liquids, or even by slurries when they are employed as the fluids between which the pressure energy is to be transferred.

Subsequent to the patenting of the energy exchange engine as illustrated and described in U.S. Pat. No. 3,431,747, improvements have been made in the type of seal plate structure employed in such pressure energy transfer devices. The need for such improvement has arisen largely out of the difficulty of providing efficient and smoothly functioning seal members between the moving rotor structure and the closure plates provided at opposite ends thereof, where such seal members are utilized for periodically and intermittently communicating high and low pressure fluids, in alternating sequence, to the bores of the rotor. It will be apparent that the nature of this periodic and intermittent communication is such that a bore opening moves rapidly into and out of communication with a registering port or fluid passageway formed in the stationary closure plate or stator block at the end of the rotor assembly, and it is necessary to nearly instantaneously establish communication to facilitate fluid flow into the rotor bore, and then nearly instantaneously terminate such communication without loss of fluid between the contacting planar surfaces.

The problem of maintaining an effective seal prior to and immediately following the establishment of communication in the manner described is compounded by the fact that relatively high and relatively low pressure fluids are alternately being passed into and out of the same bore in the rotor to different ports or fluid passageways in the closure plate as the fluid in one end of each bore is alternately introduced at high pressure and then, following decompression, is discharged at a relatively low pressure in response to the entry of a higher pressure fluid into the opposite end of the bore. Stated differently, any sealing structure which is interposed between the planar end face of the moving rotor and the stationary closure plate or stator block through which fluids are communicated with the rotor is necessarily subjected to fluctuating forces during each cycle of the rotor as the ports through the sealing structure, and serving to establish communication between the rotor bores and the fluid passageways in the closure plates, are used for alternately passing high pressure fluid and then low pressure fluid.

Improvements in the seal plate structures utilized in pressure energy exchange apparatus of the type described have taken the form of disk-shaped seal plates which are provided with ports of varying area, size and geometry, and with certain relieved areas formed in the opposite planar faces of such seal plates at locations between the ports. Structures of this type which have effected a significant improvement in the sealing function in these types of energy exchange engines are depicted and described in U.S. Pat. Nos. 3,582,090 and 3,910,587. In each of these patented structures, however, it has still been thought necessary to retain, as a portion of the seal plate structures there described and illustrated, many O-ring seal rings around the various ports which are provided and, due to the somewhat asymmetric geometry of some of the port shapes, the configurations of such sealing rings have, of necessity, also been asymmetrical. The seal plates which have heretofore been proposed have, moreover, functioned more efficiently, and with less frictional drag imposed on the system, at certain rotational speeds of the rotor and line pressures of the system than at others as the pressure exchange apparatus is utilized under varying conditions. It has thus been necessary to design the seal plates for effecting sealing at that time during the rotational cycle of the rotor when the most severe operating conditions are encountered. In doing so, the result has been that a relatively higher frictional drag is imposed on the system, and a higher rate of seal plate wear occurs, at certain times during the rotational cycle of the rotor, as compared to other times when the seal plates are called upon to effect sealing under pressure conditions which more nearly balance the fluid forces acting on opposite sides of the seal plates.

GENERAL DESCRIPTION OF THE PRESENT INVENTION

The present invention provides apparatus for transferring energy from a fluid which is under relatively high pressure to a fluid which is at a relatively lower pressure, which apparatus is mechanically simplified and highly efficient in sealing against the escape and loss of the fluids handled by the apparatus, and requires relatively less power to operate. The present invention, as compared to energy exchange engines of the patented types described above, is of simpler, less expensive construction, achieves better pressure balancing across the seal plates, is able to operate efficiently from zero pressure to design pressure, and is able to start at full RPM rather than requiring a gradual build-up.

Broadly described, the apparatus of the present invention which functions in an efficient manner for exchanging pressure energy between a fluid at a relatively high pressure and a fluid at a relatively low pressure includes rotating and stationary structural elements, with the rotating elements including a rotor assembly and improved seal plates which are rotated in conjunction with the rotor assembly. The rotor assembly includes a plurality of fluid-conveying conduits or tubes which extend in general parallelism and are retained in their positional relationship to each other and about the central rotational axis of the rotor assembly by means of a retaining structure. The retaining structure which is used will, however, permit some longitudinal shifting of the fluid-conveying conduits relative to each other, and relative to seal plates carried at opposite ends thereof in a manner hereinafter described. The means which remains the radial positional relationship of the conduits to each other and about a central rotational axis also functions to carry certain seal plate engaging means utilized for movably engaging seal plates carried at opposite ends of the rotor assembly.

The rotor seal plates employed at opposite ends of the rotor assembly are disk-shaped members which each include a first side which carries a sealing surface into which are formed a plurality of circumferentially spaced ports. On the opposite side of each seal plate, a plurality of conduit-receiving recesses are formed into the respective seal plate, with each of these recesses opening at the second side of the seal plate and extending through the plate into communication with one of the ports which open into the seal plate on the first-mentioned side which carries the sealing surface. Each of the conduit-receiving recesses receives an end of one of the elongated fluid-conveying conduits described. Each of the seal plates also carries means for engaging the respective seal plate with the seal plate engaging means carried on the retaining means used to retain the conduits in their spatial relationship to each other about the central rotational axis of the rotor assembly. This engagement connects the seal plates to the rotor assembly for mutual rotation therewith about the central rotational axis of the rotor assembly.

At opposite ends of the rotor assembly and disposed on opposite sides of the rotor seal plates from the rotor assembly are a pair of stator blocks. Each of the stator blocks is positioned immediately adjacent one of the seal plates, and each stator block includes a first side which is in sealing contact with the sealing surface on one side of the adjacent seal plate. This first side of each stator block has at least two spaced ports therein which are disposed radially equidistantly from the common central rotational axis of the rotor assembly, as are the ports of the seal plates, so that as the rotor assembly and the seal plates engaged therewith undergo rotation, the ports in each stator block intermittently and periodically communicate with each of the ports in the seal plate with which the respective stator block is in sealing contact. Each of the stator blocks also includes means, which can be in the form of fluid passageways, for communicating a fluid through the stator block to each of the stator block ports while maintaining the fluid passing to each of the stator block ports isolated from the fluid passing to each of the other stator block ports. Finally, the apparatus of the invention includes means for driving the rotor assembly in rotation about said central rotational axis.

As contrasted with rotor-seal plate types of energy exchange engines of the prior art, the present invention employs floating seal plates which can undergo canting movement during rotation, which seal plates sealingly cooperate with fixed or stationary stator blocks. Also the seal plates are maintained at a more even contact pressure during all increments of the rotational cycle of the rotor assembly than in prior devices.

An important object of the present invention is to achieve an improved sealing arrangement and structure in an apparatus which includes a rotor sealingly related to stationary fluid transfer structures in a system for exchanging energy between relatively high and relatively low pressure fluids.

More specifically, an advantage of the pressure energy transfer apparatus of the present invention is the construction of the apparatus which permits a very significant reduction in the need for, and number of, O-ring seals employed in the sealing structure associated with a rotor forming a part of the present energy transfer apparatus, and indeed, in some forms, even permits all O-ring seals to be eliminated.

A further object of the invention is to provide an energy transfer apparatus for transferring pressure energy between fluids, which apparatus includes a rotating assembly into which the fluid is intermittently and periodically introduced, which rotating assembly can be more easily driven than in prior similar assemblies, and which entails in its construction fewer parts and larger tolerances between relatively moving structural elements.

An additional object of the invention is to provide an energy exchange engine for transferring fluids between relatively high and relatively low pressure fluid systems, which engine involves a rotor containing elongated tubular members in which separatory elements are reciprocably mounted, and which reduces pulsations occurring during use of the apparatus, as compared to prior apparatus, by the arrangement of the bores and porting utilized in the system.

A further object of the invention is to provide an apparatus for transferring energy between a relatively high and a relatively low pressure fluid, which apparatus includes a rotor positioned between stator blocks employed to communicate the high and low pressure fluids to conduits forming a part of the rotor, with such communication being via seal plates which are floatingly and movably mounted on, and carried with, the rotor, but which continuously maintain effective sealing engagement between the rotor and the stator blocks.

Another and an important object of the invention is to provide an improved apparatus for transferring energy between a relatively high and a relatively low pressure fluid, which apparatus includes a pair of seal plates positioned between a rotating rotor assembly and a pair of stationary stator blocks, which seal plates are constructed to achieve pressure balancing during operation of the apparatus, and to reduce the drag imposed upon the rotor by the apparatus at critical seal surfaces during operation of the apparatus.

Yet another object of the invention is to provide apparatus for transferring energy between a fluid which is at a relatively high pressure and a fluid which is at a lower pressure, which apparatus is relatively easy to assemble, but is mechanically sturdy and is characterized in having a longer trouble-free operating life than has been characteristic of similar apparatus as previously constructed.

A further object of the present invention is to eliminate the need for dial gauges in setting the initial loading of the seal plates.

Additional objects and advantages of the invention will become apparent as the following detailed description of certain preferred embodiments of the invention is considered in conjunction with the accompanying drawings which illustrate these embodiments.

GENERAL DESCRIPTION OF THE DRAWINGS

FIG. 1 is a sectional view taken along a longitudinal plane through the center of the apparatus for transferring pressure energy, and showing a major portion of the overall length of the apparatus. That end portion of the apparatus which is not shown in FIG. 1 is identical in construction to the left end of the apparatus which is there illustrated.

FIG. 2 is a sectional view taken along line 2—2 of FIG. 1.

FIG. 3 is a sectional view taken along line 3—3 of FIG. 2 and illustrating the appearance of one side of a stator block used in the apparatus.

FIG. 4 is a view in elevation of that side of one of the seal plates of the apparatus which faces a stator block used in the apparatus.

FIG. 5 is a view in elevation of the opposite side of a seal plate from that side which is illustrated in FIG. 4.

FIG. 6 is a schematic sectional view taken through portions of one of the seal plates and one of the stator blocks of the apparatus and illustrating the relationship of these structures at one point in time during operation of the apparatus.

FIG. 7 is a view similar to FIG. 6 but illustrating the relationship of seal plate to stator block at a different time during operation of the apparatus.

DETAILED DESCRIPTION OF A PREFERRED EMBODIMENT OF THE INVENTION

Referring initially to FIG. 1 of the drawings, the energy exchange apparatus of the invention is illustrated in section and includes, in the illustrated embodiment, a generally cylindrical rotor housing designated generally by reference numeral 10. Other forms and constructions of housings can also be used. The rotor housing 10 encloses a rotor assembly designated generally by reference numeral 12. Stationary non-rotating means in the form of a pair of substantially identical stator block assembly means 14 are disposed at opposite ends of the rotor housing 10 and are secured to the respective open opposite ends of the rotor housing by means of threaded bolts 16 (in the manner illustrated in FIG. 1 as characteristic of that stator block assembly means which is secured to the left end of the rotor housing). It should be pointed out that in FIG. 1, the right-hand end portion of the pressure energy transfer apparatus has not been illustrated for the reason that it is identical to the illustrated left end portion of the apparatus, and description of the portrayed portions of the apparatus will therefore adequately define and describe the identical portions located at the right-hand end of the pressure energy transfer apparatus.

The rotor assembly 12 includes elongated fluid pressure transfer passageways in the form of a plurality of elongated conduits or rotor bore tubes which extend substantially parallel to each other in the rotor assembly, and are arrayed about a centrally located rotational axis so as to be radially equidistant from this axis, and equidistant in their circumferential spacing from each other. In the illustrated embodiment of the invention, nine of such rotor bore tubes are provided with three of these tubes 18, 20 and 22 being illustrated in FIG. 1. In general, an odd number of the rotor bore tubes is preferred.

A movable, fluid-displaceable separatory member 24 which functions to divide each of the rotor bore tubes into a pair of compartments disposed on opposite sides of the separatory member is slidably positioned in each of the elongated conduits or rotor bore tubes included in the rotor assembly 12. The separatory members 24 are axially displaceable in each of the respective rotor bore tubes, and undergo reciprocation in their respective tubes at a time during operation of the rotor assembly 12 as hereinafter described. The design of the separatory member 24 can vary, but in any case is within skill of the art so as to attain the necessary mobility while minimizing fluid leakage across the member.

The rotor assembly 12 further includes means functioning to retain the positional relationship of the rotor bore tubes about a central rotational axis of the rotor assembly, and in circumferentially spaced relation to each other. The retaining means which is thus provided includes a pair of generally disk-shaped rotor drive plates 26 disposed at opposite ends of the rotor assembly 12, and having a plurality of circumferentially spaced holes through which the several rotor bore tubes are slidably extended as shown in FIG. 1. In correspondence to the number of rotor bore tubes, there are, of course, nine holes provided in the rotor drive plates 26 at opposite ends of the rotor assembly.

In the illustrated embodiment of the invention, each rotor drive plate 26 includes a central hub portion 28 which fits around, and is retained by means of a key 29 upon, an elongated, centrally positioned shaft 30 to facilitate rotation of the rotor drive plates with the shaft during operation of the rotor assembly. The rotor drive plates 26 are retained in their axial position on the shaft 30 by providing the shaft with necked down end portions 32 of reduced diameter which carry an external thread so that lock nuts 34 can be threaded onto the opposite ends of the shaft to retain the drive plates in their illustrated axial positions on the shaft. Removal of the lock nuts 34 will facilitate removal of the rotor drive plate 26 at such times as it may be desired to disassemble the apparatus.

Each of the rotor drive plates 26 also carries a plurality of rotor seal drive pins 40, which pins have a base portion 40a secured in a receiving aperture in the respective drive plate 26. The rotor seal drive pins 40 also each have a rounded outer end portion 40b which is connected to the base portion 40a by a neck portion 40c of reduced diameter. In the illustrated embodiment, each of the rotor drive plates 26 carries three of the rotor seal drive pins 40 spaced from each other by 120° in a circumferential sense, and the function of these pins will be hereinafter explained.

At a central location on the shaft 30, the shaft has keyed thereto by means of a key 43, a rotor drive sprocket 44 which has a central aperture for receiving the shaft 30, and which carries at its outer periphery a plurality of sprocket teeth 46. The drive sprocket 44 is apertured at circumferentially spaced locations around its central hub 45 to permit the rotor bore tubes to be extended therethrough. The relationship of the diametric dimension of the holes in the sprocket for passing the rotor bore tubes to the outer diameter of these tubes is such that the tubes can undergo slight axial shifting along the length of the rotor assembly 12 in relation to the drive sprocket 44. The sprocket 44 is retained in its central position on the shaft 30 by means of a pair of lock nuts 50 and 52 which are threaded upon threaded portions of the shaft 30 adjacent the location on the shaft where the sprocket is located. It will be noted in referring to FIG. 1 that the rotor housing 10 is provided with a peripheral opening 54 therethrough at a location in radial alignment with the sprocket 44 so that a chain from a suitable external prime mover can be passed around the sprocket for purposes of driving the rotor in rotation about the axis of the shaft 30 in a manner more fully hereinafter described.

It may here be pointed out that in other embodiments of the invention, the shaft 30 and drive sprocket 44 may be omitted and other types of drives for the rotor assembly employed. For example, a peripheral drive with appropriate bearings can be utilized, as can an internal hydraulic drive using a part of the fluid pressure of the pressurized fluids charged to the apparatus.

A pair of identically constructed rotor seal plates designated generally by reference numeral 56 are located at opposite ends of the rotor assembly 12 and within the rotor housing 10. Each seal plate 56 is of generally disk-shaped configuration having, in the illustrated embodiment, a cylindrically shaped outer peripheral surface 58 and a pair of opposed side faces or surfaces 60 and 62. The opposed surfaces 60 and 62 extend substantially parallel to each other, and are substantially monoplanar in character. The side 60 of each of the seal plates 56 faces toward, and is adjacent, the respective rotor drive plate 26 located on that same end of the rotor assembly 12, and is characterized in having a plurality of conduit-receiving recesses 64 opening from this side or face into the respective seal plate. Each of the conduit-receiving recesses 64 is of a sufficiently large diameter that the end portion of one of the rotor bore tubes 18-22 can be loosely received therein—that is, the rotor bore tubes are characterized in having an outside diameter which is less than the diameter of the conduit-receiving recesses formed in the seal plates 56.

Each of the seal plates 56 is also characterized in having a plurality of drive pin recesses 66 formed into the seal plate from the surface 60, and functioning to receive the free outer ends of the several drive pins 40 carried on the drive plates 26. In the illustrated embodiment of the invention, three of the drive pin recesses 66 are provided in each seal plate 56, with these recesses being circumferentially spaced from each other on spacings of 120° around the seal plate as shown in FIG. 5. It will be noted in referring to FIG. 1 that the cooperation and type of engagement between each pin recess 66 and the drive pin 40 which extends thereinto is such that some reciprocatory movement of the respective seal plate 56 along the drive pins is permitted (since each drive pin does not extend more than about halfway over the total depth of the respective pin-receiving recess). It also may be here pointed out that the spherical character of the outer free end of each of the drive pins 40, coupled with the reduced diameter of the neck portion 40c thereof, permits some rocking or canting movement of the respective seal plate 56 on the drive pins.

Each of the seal plates 56 has a central bore 68 formed through the seal plate between the surfaces 60 and 62, with such bore functioning to receive and pass the end portions of the shaft 30. It will be noted in referring to FIG. 1 that the diameter of the bore 68 formed in the respective seal plate 56 is slightly larger than the outside diameter of the necked down end portion 32 of the shaft 30 which passed therethrough, so that rocking or canting movement of the seal plates 56 is permitted in relation to the axis of the shaft 30. In other embodiments of the invention which do not include a central shaft, such as a peripherally driven rotor assembly, it is still desirable that the seal plates be able to undergo the canting movement in relation to the rotational axis of the rotor assembly.

From the description of the apparatus for transferring energy constructed in accordance with the present invention as thus far set forth, it will be perceived that the rotor assembly 12 which includes the shaft 30, the rotor drive plates 56, the rotor bore tubes or conduits 18-22, the rotor seal drive pins 40 and the drive sprocket 44, is inter-engaged with the floating rotor seal plates 56 disposed at opposite ends of the rotor assembly. The drive pins 40 function to assure mutual rotation of the rotor seal plates 56 with the rotor assembly, but the driving engagement is such that these seal plates can shift slightly in an axial direction (in reference to the rotational axis of the rotor assembly), and can also move in a canting or slanting movement in respect to the rotational axis of the rotor.

For the purpose of assuring sealing engagement between the end of each of the rotor bore tubes or conduits and the respective rotor seal plate 56 in which it is received, each conduit or tube has a slightly upset external shoulder near each of its ends, as shown at 18b for the rotor bore tube 18 illustrated in FIG. 1. The upset shoulder 18b is located contiguous to an annular groove 18c in the rotor bore tube, in which groove is located a Parker back-up ring and an annular O-ring seal 70 of sufficient outside diameter to sealingly bear against the walls of the respective conduit-receiving recess 64 formed in the respective seal plate. This structure enables the maintenance of sealing engagement between the end portion of each of the rotor tubes and its respective seal plate 56, despite canting movement of the seal plate in relation to the conduits or tubes which it receives, or axial shifting movement of either the seal plate or the received conduits in relation to the rotational axis of the rotor assembly. Other types of tube sealing arrangements can be employed in addition to that illustrated and described.

It will further be noted in referring to FIG. 1 that a helically shaped compression spring 72 is positioned between the end of each of the rotor bore tubes or conduits and the bottom of the respective conduit-receiving recess 64 into which it projects in one of the seal plates 56. The cooperative action of the compression springs 72 disposed at opposite ends of the several rotor bore tubes resiliently biases the seal plates 56 in an axial direction away from the rotor assembly 12, and more specifically, outwardly from the ends of the several rotor bore tubes.

The surface or side 62 of each of the seal plates 56 carries a raised annular bearing and sealing surface 74. The bearing and sealing surface 74 is illustrated in FIG. 4 of the drawings, and will there be perceived to define a plurality of elongated, arcuately shaped ports 76 which are equidistantly circumferentially spaced from each other around the bearing and sealing surface 74. Each of the ports may be described as kidney or peanut shaped in configuration, and in the illustrated embodiment nine of such ports are provided. It will also be noted in referring to FIG. 4 that the ports 76 in the bearing and sealing surface 74 carried by the seal plate 56 are equidistantly spaced from the central rotational axis of the rotor assembly 12 as it passes through the shaft opening 68 provided at the center of the seal plate.

As illustrated in FIGS. 1 and 5, each of the ports 76 is positioned directly opposite one of the conduit-receiving recesses 64 formed in the opposite side of the seal plate, and communicates through the seal plate with such conduit-receiving recess. What may be termed islands 78 separate the ports 76, as well as the conduit-receiving recesses 64, from each other.

At the opposite ends of the rotor housing 10, the housing is closed by a pair of identically constructed stator blocks 80. Each of the stator blocks 80 is generally disk-shaped in configuration in the embodiment here under description and includes a generally cylindrically shaped peripheral surface 82.

Each stator block 80 also includes an external side or surface 84 and an internal side or surface 86 which faces toward one of the seal plates 56 disposed inside the rotor housing at one end of the rotor assembly 12. The stator blocks 80 are each secured to the rotor housing 10 by means of the plurality of elongated externally threaded bolts 16 which are projected through bolt-receiving passageways 90 formed near the peripheral surface of the stator block and aligned with threaded bolt-receiving passageways 92 formed in the rotor housing 10.

One of the functions of the stator blocks 80 is to rotatably support the rotor assembly 12 within the rotor housing 10. To this end, each of the stator blocks 80 is provided with a relatively large central bore 94 therein which receives a bearing sleeve 96. The bearing sleeves 96 in the stator blocks 80 function to journal the opposite ends of the shaft 30 of the rotor assembly 12 so that the assembly can undergo rotation about the longitudinal axis of the shaft. The shaft carries snap rings 95 around its opposite end portions adjacent the stator blocks to prevent axial shifting of the shaft.

A second important function of the stator blocks 80 is to facilitate the transfer of high and low pressure fluids from isolated or external sources through the stator blocks to the ports 76 in the seal plates 56 and thence, via the conduit-receiving recesses 64, to the several rotor bore tubes of the rotor assembly 12. For this purpose, each stator block is provided with a pair of internally threaded, generally cylindrical fluid passageways or bores 97 and 98 which project inwardly into the stator block from the external face or surface 84 thereof, and these communicate at their inner ends with counterbores 99 and 100, respectively. As shown in FIG. 3, two of the bore-counterbore pairs are provided in each stator block 80 and are spaced therearound 180° from each other. On the opposite side of each stator block 80 from the external face 84, a raised annular bearing and sealing surface 102 is provided on, and projects out of the plane of, the internal surface or side 86 of the respective stator block.

The annular bearing and sealing surface 102 carries a pair of elongated arcuate fluid distribution ports 104 and 106 which are positioned for communication internally of the respective stator block with the counterbores 99 and 100, respectively. The fluid distribution ports 104 and 106 are spaced equidistantly from the rotational axis of the rotor assembly 12 and are curved on arcs described by radii extended from the rotational axis of the rotor assembly. It will be noted in referring to FIG. 1 that the fluid distribution ports 104 and 106 are disposed at the same distance from the axis of rotation of the rotor assembly 12 as are the ports 76 in the seal plates. Thus, as the rotor assembly 12 undergoes rotation, and with it the seal plates 56, the ports 76 formed in the respective seal plates 56 at the sides thereof which face the respective stator blocks 80 intermittently and periodically pass into registration with each of the arcuate fluid distribution ports 104 and 106 in the respective stator block 80.

In order to facilitate the discussion of the operation of the energy transfer apparatus of the invention which follows hereinafter, it is convenient to refer to that portion of each stator block 80 which lies between the opposed ends of the arcuate fluid distribution ports 104 and 106 as an island. Thus, it will be perceived in referring to FIG. 3 that the islands 108 and 110 separate the opposed or facing ends of the two fluid distribution ports 104 and 106 from each other. An angular fluid bleed orifice 111 is formed in each of the stator blocks 80 at opposite ends of each of the arcuate fluid distribution ports 104 and 106. As shown in FIG. 4, each angular fluid bleed orifice 111 includes a leg 112 which projects laterally into the stator block 80 from the bottom portion of the respective arcuate distribution port and in a direction which is substantially parallel to the inner face or surface 86 of the respective stator block. Intersecting the leg 112 of the orifice 111 at a right angle is a second leg 114 which projects to the bearing and sealing surface 102 of the stator block, and opens at this surface in one of the respective islands 108 and 110.

OPERATION

In the operation of the energy exchange apparatus of the invention, the stator blocks 80 at opposite ends of the assembly are initially connected to two process fluids which are at different pressures and between which pressure energy is to be transferred. For convenience of description, the two fluids will be described as liquids A and B, and will be considered to be at pressures $P_2$ and $P_1$, respectively. The pressure $P_1$ of liquid B is substantially greater than the pressure $P_2$ of liquid A. Either or both of the liquids may be a slurry.

Before proceeding further in the discussion of the operation of the energy exchange apparatus of the invention, it will be helpful to reiterate that the structure which is illustrated as characteristic of the left end of the apparatus, as it is shown in FIG. 1, is duplicated in the right end of the apparatus not there shown. Thus, a second identical stator block 80 located at the right end of the apparatus also includes fluid passageways with communicating counterbores which are positioned between the fluid passageways and arcuate, banana-shaped distribution ports identical in shape and position to the ports 104 and 106 in the illustrated stator block. It should be further pointed out that the distribution ports formed in the bearing and sealing surface of the stator block at the right end of the apparatus are longitudinally aligned with the distribution ports 104 and 106, so that any communication of either of these latter distribution ports with one or more of the rotor bore tubes included in the rotor assembly 12 will, at the same instant in time, involve a corresponding communication between the same rotor bore tubes with the corresponding arcuate distribution ports in the stator block located at the right end of the apparatus.

The liquid A, which can be assumed to originate at a typical source within an industrial process, is connected via a suitable tube or conduit to the internally threaded fluid passageway 97 in the stator block 80. This fluid passageway will be referred to as the "low pressure fluid passageway" for reasons which will be hereinafter described. The liquid A at the relatively low pressure $P_2$, upon entering this passageway, is immediately communicated via the counterbore 99 with the distribution port 104 which will be hereinafter referred to as the "low pressure distribution port." The aligned distribution port which is formed in the other stator block 80 disposed at the opposite end of the apparatus is communicated through a counterbore with an internally threaded fluid passageway, which passageway is connected by a suitable pipe or tube to a relatively low pressure zone. By relatively low pressure zone is meant a zone which is at a pressure $P_2'$ slightly lower than the pressure $P_2$ of the liquid A. In many instances, this pressure $P_2'$ will be atmospheric pressure.

The second arcuate distribution port (corresponding to the distribution port 106) which is formed in the stator block 80 at the opposite end of the apparatus from that shown in FIG. 1 is connected via its communicating counterbore and fluid passageway in that stator block to a source of the high pressure liquid B at pressure $P_1$. The fluid passageway 98 (hereinafter referred to as a high pressure discharge passageway) and its communicating counterbore 100 and distribution port 106, hereinafter referred to as a high pressure distribution port, are connected to a suitable fluid confining or restricting means which can retain or maintain a fluid under pressure $P_1'$ slightly lower than $P_1$, and can permit fluid under pressure to be pumped thereinto from the high pressure fluid discharge passageway 98.

With these connections made to the several fluid passageways through the stator blocks 80, the depicted apparatus can be utilized for efficiently transferring pressure energy from the high pressure liquid B to the relatively low pressure liquid A. This is accomplished by rotating the rotor assembly 12 when the stator blocks 80 are connected to the fluid sources in the manner described. With the rotor assembly 12 in rotation about the axis of the shaft 30, the seal plates 58 at opposite ends of the rotor assembly are also rotated so that the circumferentially spaced ports 76 in each of the seal plates 56 are periodically and sequentially brought into communication with the arcuate distribution ports 104 and 106 in the stator block 80 at the left end of the apparatus (as shown in FIG. 1), and with the corresponding distribution ports in the stator block at the opposite end of the apparatus. Reference to FIGS. 3–5 of the drawings will show that several of the peanut-shaped ports 76 in the stator block 56 are able to concurrently communicate or register with one of the substantially larger, elongated arcuate distribution ports during the rotation of the rotor assembly. During the described communication, the rotor bore tubes of the rotor assembly 12 which communicate through the conduit-receiving recesses 64 with the several peanut-shaped ports 76 in the seal plate 56 are also periodically and sequentially communicated via the latter ports with the arcuate distribution ports 104 and 106. Stated differently, the nine rotor bore tubes, typified by tubular members 18, 20 and 22, are, in consecutive sequence, brought into axial alignment with the large arcuate distribution ports 104 and 106 formed in that side of the stator block 80 which faces toward the seal plate 56.

At that time during the operation of the apparatus when any one of the rotor bore tubes is axially aligned with one of the large arcuate fluid distribution ports and its corresponding counterbore and fluid passageway in the stator block 80, these structures are in the positional relationships to each other exemplified by the conduit 18, the counterbore 100 and the fluid passageway 98 as they are shown in FIG. 1. At this instant in the operation of the device, the liquid B at relatively high pressure $P_1$ enters the tubular member 18 from the right end of the apparatus via the stator block 80 disposed at that end of the apparatus (through the high pressure fluid passageway, counterbore and fluid distribution port in that stator block, and one of the peanut-shaped ports in the seal plate located adjacent thereto). The high pressure liquid B, in entering the rotor bore tube 18, acts upon the separatory member 24 to drive the separatory member toward the left and, in doing so, to displace the liquid on the opposite side of this separatory member. This liquid is the liquid A from the low pressure liquid source. This liquid has been charged to the rotor bore tube 18 at an earlier time in the rotational cycle when this rotor bore tube was in axial alignment with the low pressure fluid passageway 98, the counterbore 99 and the arcuate low pressure distribution port 104 in the stator block 80. This charging of the low pressure liquid A will subsequently become better understood as the explanation proceeds.

Given the existence of such lower pressure liquid A in the rotor bore tube 18 at the time that this tubular member moves into the position shown in FIG. 1, high pressure fluid B is communicated at this time with this rotor bore tube from the right side of the apparatus via the stator block and seal plate there positioned. Fluid from the previously described fluid confining means is concurrently communicated with the other end of the tube 18 and exerts pressure $P_1'$ on the liquid then in the tube. The pressure $P_1$ of liquid B is, however, higher than $P_1'$, and the effect of the differential pressure is to cause the separatory member 24 to move to the left, discharging the fluid A through the port 76 in the seal plate 56, and then through the large arcuate high pressure distribution port 106, and the associated counterbore 100 and high pressure fluid discharge passageway 98. The high pressure discharge passageway 98 is connected to the fluid confining or restricting means which can retain a fluid under pressure or maintain a fluid at a predetermined elevated pressure, and can permit fluid under pressure to be pumped thereinto from the high pressure discharge passageway. High pressure liquid B at pressure $P_1$ thus increases the pressure of the liquid A, and pumps it out of the left end of the rotor bore tube 18 via the high pressure fluid discharge passageway 98.

When the rotor assembly 12 rotates to bring the rotor bore tube 18 into communication, via the face seal 56, with the low pressure distribution port 104, and consequently with the counterbore 99 and low pressure fluid inlet passageway 97, the separatory member 24 is in the left end portion of the rotor bore tube 18, and the volumetric portion of this tubular member to the right of the separatory member 24 is filled with the liquid B. At this time the liquid B is at some pressure $P_3$ lower than its original pressure $P_1$ and higher than the pressure $P_1'$ as a result of transfer of pressure energy to the liquid A discharged through the high pressure liquid discharge passageway 98. Also just prior to this time (when the rotor assembly 12 is moving the rotor bore tube 18 between positions of alignment with the high and low pressure distribution ports 106 and 104, respectively), the extreme left end of the tube 18, and the port 76 with which it communicates, are filled with the liquid A at the pressure $P_1'$ which is lower than $P_3$ but higher than $P_2$.

Upon the establishment of such communication between the rotor bore tube 18 and the low pressure fluid passageway 97, counterbore 99 and the arcuate low pressure distribution port 104, the relatively low pressure liquid A at pressure $P_2$ can enter the fluid passageway 97 and pass through the arcuate distribution port 104, the aligned port 76 in the seal plate 56 and into the rotor bore tube 18. At this time, the opposite end of the tubular member 18 will be in communication with the appropriate ports and passageways in the seal plate 56 and stator block 80 at the other end of the apparatus, and the liquid B carried within the tubular member 18 to the right of the separatory member 23 will depressurize and be discharged through the seal plate and the stator block to the relatively low pressure zone at $P_2'$. The pressure $P_2'$ in this zone will be lower than the pressure $P_2$ characterizing the liquid A which is at that time entering the left end of the rotor bore tube 18 via the low pressure fluid passageway 97, the counterbore 99, the low pressure arcuate distribution port 104 and the port 76. Thus, the separatory member 24 will be driven toward the right to discharge the liquid B from the energy exchange apparatus, and the tube 18 will be refilled with the liquid A preparatory to repeating the cycle as it has been described. Pressurizing of the liquid A commences at the time when the rotor bore tube 18 has been rotated back into the position illustrated in FIG. 1 in which it communicates at one end with the high pressure discharge passageway 98 via the seal plate 56 and the stator block 80, and receives high pressure liquid B.

It will be understood that the rotational cycle which has been described by making reference to the rotor bore tube 18 is the same as that which is undergone by each of the nine rotor bore tubes in consecutive sequence during each rotation of the rotor assembly. Moreover, it should be pointed out that the distribution ports in the stator block at the right side of the apparatus can also be referred to as a low pressure distribution port and a high pressure distribution port since one "sees" a relatively high pressure $P_1$ upon the charging of the liquid B, and the other sees a relatively low pressure when this liquid is discharged.

This operation of a rotary energy exchange apparatus of this general type is explained in greater detail in U.S. Pat. No. 3,431,747. That patent is incorporated herein by reference in order to afford further elucidation of the general principles of operation of such energy exchange systems which include rotors discharging alternately through high and low pressure fluid passageways formed in fixed structures at the opposite ends of the rotor. The net effect is to transfer a substantial part of the energy of pressurization of a high pressure fluid to a relatively low pressure fluid so that the pressure is increased in the latter fluid as pressure decreases in the relatively high pressure fluid.

As explained in detail in U.S. Pat. Nos. 3,582,090 and 3,910,587, an important factor in the effectiveness with which energy exchange apparatus of the type described can be operated is the efficiency and mode of functioning of the seal plates which are provided for maintaining fluid seals between the rotating structure (the rotor assembly) and the stationary structure (stator blocks or closure plates). It will be apparent that in the apparatus of the present invention, sealing is obtained primarily by the sealing engagement effected between the annular sealing and bearing surface 74 on the side of each seal plate which faces the respective stator block 80, and the annular sealing and bearing surface 102 formed on the inwardly facing side 86 of each stator block and carrying the arcuate distribution ports 104 and 106. For proper sealing to be effected at this location, it is essential that the seal plates 56 bear against the stator blocks 80 with force adequate to maintain them in flat abutting sealing contact with the annular bearing and sealing surface 102 of the stator block at all times during rotation of the rotor assembly 12. (The "sealing contact" here referred to is "contact" such that a slight leakage, resulting in the development and presence of a stable liquid film between sealing surfaces, is purposely caused to occur during operation of the apparatus.) It is also apparent, however, as is explained in greater detail in U.S. Pat. Nos. 3,582,090 and 3,910,587, that a force in excess of that needed to maintain the described sealing contact should not be exerted against the seal plates 56 to force them against the respective bearing and sealing surfaces 102 of the stator blocks 80. Such excess force increases the drag opposing rotation of the rotor assembly 12, and decreases the efficiency with which the system can be operated. It also reduces the effective operating life of the seal plates.

In an effort to improve the operating efficiency of the system, and to increase the life of the seal plates employed, various proposals have been made for altering the area, geometry and spatial relationship of those ports formed in the sides of the seal plates which face the stator blocks, and in the registering ports or passageways which are formed in the stator blocks. Some of these arrangements are described in U.S. Pat. Nos. 3,582,090 and 3,910,587. In general, the rationale underlying such proposals is to change the areas of the seal plate upon which the differing fluid pressures are permitted to act at different times during the rotation of the rotor so that an approach is made to a continuously pressure-balanced seal plate. In other words, the forces acting on opposite sides of the seal plate are caused to vary in correlation to changing fluid pressure conditions to attempt to thereby achieve the minimum net force which can be depended upon to maintain sealing contact between the seal plate and stator block at all times during rotation of the rotor assembly.

The objective in altering the configuration of the ports in the seal plate and stator block, and of the island areas between such ports, is to change the magnitude of the forces acting on opposite sides of the seal plate in a way which minimizes the net force acting to force the seal plate into the stator block at any given time during rotation of the rotor assembly. It will be perceived from a reading of the foregoing description of the operation of the apparatus, and from a perusal of U.S. Pat. Nos. 3,582,090 and 3,910,587, that the difficulties of achieving minimization of force imbalance across the seal plate at each instant during one cycle of rotation of the rotor assembly is due in large part to the fact that over one increment of its rotational cycle, the seal plate is subjected to relatively high pressure from one of the fluids passing through the fluid stator block and seal plate to the rotor bore tubes or conduits, and at another instant to a relatively low pressure developed by passage through the seal plate of the other, relatively lower pressure fluid.

In considering the manner in which the seal plates 56 function during the operation of the energy exchange apparatus of the invention, it is necessary to understand the manner in which the fluid pressures act against certain areas of the seal plate. As the rotor assembly 12 rotates, the arcuately shaped ports 76 sequentially and periodically communicate with the large fluid distribution ports 104 and 106 formed in the annular bearing and sealing surfaces 102 of the two stator blocks 80. The exposure of certain areas to changing pressures can be illustrated, as it is typical of all the ports 76, islands 78, recesses 64 and the ports 104 and 106, by referring only to the recess 64 and port 76 which are at the end of, and communicate with, the rotor bore tube 18.

Referring to the status of the rotor assembly 12 illustrated in FIG. 1, the rotor bore tube 18 is at this time aligned via the conduit-receiving recess 64 and the arcuate port 76 with the arcuate high pressure fluid distributing port 106 in the stator block 80. At this time during rotation of the rotor assembly, the liquid A (which has previously been charged to the left end of the rotor tube 18) is being discharged therefrom by the force acting upon the separatory member 24 as a result of the charging of the relatively high pressure liquid B to the bore tube 18 at the right end thereof. It has been previously explained that the liquid A is discharged through the high pressure passageway 98 to a chamber (not shown) in which the liquid is confined. At this time, the liquid A will attain some pressure $P_1'$ which is higher than its original line pressure $P_2$. For convenience of expression, this pressure $P_1'$ will be hereinafter referred to as $P_4$, i.e. $P_1' \equiv P_4$. The liquid A thus exerts the pressure $P_4$ on the exposed surface area at the bottom of the conduit-receiving recess 64 which receives the end of the rotor bore tube 18. This area is an area equivalent to the sum of the areas $A_1$ and $A_2$ portrayed in FIG. 5. Stated differently, the area upon which the pressure $P_4$ acts, as exerted by the liquid A at this time, is the difference between the area of one of the arcuate ports 76 and the area of the base of the conduit-receiving recess 64. The force $F_1$ acting at this location on the seal plate, and tending to force it in the direction of the stator block on the opposite side thereof, is therefore $P_4(A_2+A_2)$. Such forces acting to force the seal plate toward and against the adjacent stator block will be hereinafter referred to as clamping forces.

On the opposite side of the seal plate 56, a force $F_2$ resulting from the pressure exerted by the liquid A acts against the raised annular bearing and sealing surface 74 of the seal plate in the opposite direction from the force $F_1$ and tends to move the seal plate away from the stator block 80. Forces acting to move the seal plate away from the adjacent stator block will be hereinafter referred to as opening forces. The force $F_2$ can, for simplification of discussion, be resolved into a consideration of an increment thereof associated with each arcuate port 76 and the respective island 78 which leads it as both are passing across the high pressure port 106 (as has been done with the clamping force $F_1$). The force $F_2$, in the case of each port and island, is approximately equivalent to the pressure $P_4$ multiplied by an area $A_3$ of the island 78 over the high pressure port 106, plus approximately one-half the product of the pressure $P_4$ multiplied by an area $A_4$. The areas, $A_3$ and $A_4$, are shown in FIG. 4 as cross-hatched areas denominated by these reference characters.

It will be apparent that in order for the seal plate 56 to maintain its sealing contact and engagement with the stator block 80 at this time, the clamping force $F_1$ must exceed the opening force $F_2$, otherwise the seal plate will be separated from the stator block sufficiently to permit undesirable and excessive leakage of the liquid A between these structural elements. It is also apparent, however, that the amount by which the clamping force $F_1$ exceeds the opening force $F_2$ should be minimized as much as possible while yet maintaining sealing contact between the seal plate 56 and the stator block 80 so that excessive drag is not imposed on the rotor assembly 12, and the energy requirement to rotate the rotor assembly thereby increased. Such minimization is accomplished, in a manner described in U.S. Pat. Nos. 3,582,090 and 3,910,587, by selectively controlling the areas $A_3$ and $A_4$ by appropriate construction and sizing of the annular bearing and sealing surface 74, and the distance which separates the arcuately shaped ports 76.

As the rotor assembly 12 continues to rotate, the seal plate 56 also rotates, causing the port 76 and conduit-receiving recess 64 aligned with the rotor bore tube 18 to eventually rotate out of communication with the high pressure distribution port 106. As this occurs, the port 76 aligned with the rotor bore tube 18 moves over, and in alignment with, the island 108 which lies between the high pressure fluid distribution port 106 and the low pressure fluid distribution port 104. The island 78 in advance of the port 76 also moves to a position in which it is aligned with and bears against the island 108 of the stator block 80. The liquid A remaining in the end portion of the bore tube 18 farthest to the left and in the conduit-receiving recess 64 and registering port 76 is thus trapped, and is retained in the port 76 and recess 64 at the pressure $P_4$, and continues to exert this pressure upon the areas $A_1$ and $A_2$ as hereinbefore described. A clamping force $F_3 = F_1 = P_4(A_1+A_2)$ thus is acting at this time.

The liquid A also continues to exert pressure against the bearing and sealing surface 74 on the opposite side of the seal plate 56 and around the port 76 which is aligned with the rotor bore tube 18. In the status where a port 76 and the island 78 which leads it are over the island 108 on the raised annular bearing and sealing surface 102 of the stator block, however, the opening force $F_4$ exerted against the seal plate and away from the rotor block becomes approximately one-half of the product of $P_4$ and the area $A_3$ plus one-half of the product of $P_4$ and the area $A_4$. (An explanation of the decrease in the magnitude of the force acting against this surface as it occurs at this time, and resulting from a pressure gradient extending outwardly from the port 76, is set forth in U.S. Pat. Nos. 3,582,090 and 3,910,587).

It will be perceived that the opening force $F_4$ tending to separate the seal plate 56 from the stator block 80 at this time is substantially less than that ($F_2$) which acts against the seal plate around the port 76 at the time when the port and the islands 78 adjacent it are in registration and alignment with the high pressure distribution port 106.

As the rotor assembly 12 continues to rotate, the port 76 which communicates via the conduit-receiving recess 64 with the rotor bore tube 18 approaches the low pressure distribution port 104, and in doing so, passes across the open upper end of the leg 114 of the angular fluid bleed orifice 111 extending to the low pressure fluid distribution port. This status of the port 76 is shown in FIG. 6 by the position of the left-hand port 76 in relation to the angular fluid bleed orifice 111 and the low pressure fluid distribution port 104. It will further be noted, in referring to this figure of the drawings, that an ajacent port 76, spaced from the left-hand port 76 by an island 78 and leading the latter port in the direction of rotation of the seal plate 56, has already passed over, and is in communication with, the low pressure distribution port 104.

At this time, the liquid A at pressure $P_4$ can pass through the angular fluid bleed orifice 111 into the low pressure distribution port 104 in the manner illustrated by the short arrows in FIG. 6. Such flow will occur as a result of the relatively high magnitude of the pressure $P_4$ in relation to the line pressure $P_2$ of the liquid A which, it will be recalled, is introduced to the energy exchange apparatus via the low pressure distribution port 104. The result of this bleed-off of the liquid A through the bleed orifice 111 into the low pressure distribution port 104 is to lower the effective pressure of the liquid A trapped in the left-hand port 76, as shown in FIG. 6, (which is the port which communicates with the rotor bore tube 18), and thus to reduce the clamping force which acts against the rotor assembly side of the seal plate 56. The bleed-off rate through the orifice 111 increases from a time when the trailing edge of the island 78, as shown by the dashed line B in FIG. 6, first commences to uncover the bleed orifice 111 and place it in communication with the port 76 until full and open communication between the orifice and this port is attained.

It will further be noted in referring to FIG. 6 that the thickness of the islands 78, as measured between the two adjacent ports 76 in the seal plate 56, is substantially equivalent to the thickness of that portion of the raised annular bearing and sealing surface 102 which separates the leg 114 of the bleed orifice 111 from the boundary of the low pressure distribution port 104. Thus, after fully open communication exists between the bleed orifice 111 and the port 76, the island 78 in advance of the port 76 in the direction of rotation of the seal plate 56 commences to move out over the low pressure distribution port 104. This next increment of movement is represented by the dashed line C in FIG. 6 which portrays one location of the leading side of the island 78 as the island commences to move over the low pressure distribution port 104.

As the left-hand port 76 and its adjacent leading island 78 undergo the described change in position in relation to the stator block 80, and particularly in relation to the bleed orifice 111 and low pressure distribution port 104 formed therein, the pressure exerted by the liquid A upon the areas $A_1$ and $A_2$ as hereinbefore described is initially decreased, with a resultant decrease in the clamping force tending to drive the seal plate 56 toward the stator block 80. This decrease in pressure and correlative decrease in the clamping force to a clamping force $F_5$ [equal to $P_2(A_1+A_2)$] occurs at a gradually increasing rate. Next, and immediately following the bleed-down in pressure exerted by the trapped liquid A, the liquid A in the low pressure distribution port 104, which is at the pressure $P_2$ as previously explained, commences to act on a part of the lower side of the island 78—that is, on the surface thereof which lies in, and forms a portion of, the raised annular bearing and sealing surface 74 of the seal plate 56. As this bounding surface (lower side) of the island 78 commences to move over the low pressure distribution port 104, the exposed part thereof having an area $A_5$ is subjected to the pressure $P_2$ and, as a result of the substantially lower magnitude of this pressure than pressure $P_4$, the net result is a lessening of the opening force which tends to move the seal plate 56 away from the stator block 80. In other words, if at this time the pressure in the left port 76 has become reduced to some pressure $P_x$ which is intermediate $P_4$ and $P_2$, the acting clamping force will be $P_x(A_1+A_2)$, which is lower than $F_1$ or $F_3$, and the opening force will be approximately $[P_x(A_3-A_5)]/2+(P_xA_{4+}/2)$ $P_xA_5$ which is less than opening force $F_4$. When the pressure of liquid in the port 76 has become equalized with that of the liquid A in the low pressure distribution port 104 ($P_2$), the clamping forces becomes $F_5=P_2(A_1+A_2)$ and the opening force becomes $F_6=[P_2(A_3-A_5)]/2+(P_2A_4/2)+P_2A_5$. If the bleed orifice 111 were not provided, the effect would be a sudden lowering of the opening force acting on the stator block side of the seal plate 56 at the time when the island 78 commenced to move over the low pressure distribution port 104 with no concomitant or compensating decrease in the clamping force $F_3$ tending to move the seal plate against the stator block. This in turn would result in a sudden increase in the drag exerted upon the rotor assembly 12 due to the higher net clamping force pushing the seal plate against the stator block.

In sum, the bleed orifice 111 alleviates such sudden increase in the force differential across the seal plate by bleeding down the pressure exerted by the liquid A upon the areas $A_1$ and $A_2$, and the clamping force $F_3$ previously acting to move the seal plate into sealing engagement with the stator block is concomitantly reduced to $F_5$. This occurs as the island 78 begins to move over the low pressure distribution port 104 to thereby reduce the opening force which is was previously necessary to counteract in order to maintain sealing engagement between the seal plate and stator block. In effect, then, the bleed orifice 111 facilitates an automatic adjustment of the magnitude of the seal plate clamping force, which adjustment is correlated to the reduction in opening force which occurs as the island 78 leading one of the ports 76 commences to move out over the low pressure distribution port. An automatic near balancing of the opposing clamping and opening forces is thus achieved which maintains sealing contact between the seal plate 56 and the stator block 80 without forcing or clamping the sealing plate against the rotor block with excessive force.

An identical action occurs as each of the several ports 76 and the respective islands 78 ahead of them move, in consecutive sequence, forward and over first the bleed orifice 111, and then the low pressure distribution port 104.

The opposite action is made to occur at such time as each port 76 and the island 78 which leads it approach the high pressure port 106. This status of the apparatus is illustrated in FIG. 7. Prior to the time that this status is achieved, the port 76 has passed across the low pressure distribution port 104 and has been charged with the liquid A at the pressure $P_2$ as hereinbefore explained. This will, of course, have occurred at the time when any one of the ports 76 and the particular rotor bore tube which communicates therewith through a conduit-receiving recess 64 are aligned, and in communication, with the low pressure distribution port 104 which is receiving liquid A at the relatively low pressure $P_2$ from the low pressure fluid passageway 97. After this time, and as the port 76 and its associated leading island 78 commence to move across the island 110 in the raised annular bearing and sealing surface 102 of the stator block 80, the liquid A at the pressure $P_2$ exerts this pressure against the areas $A_1$ and $A_2$ so that a clamping force $F_7$ continues to act which is equivalent to $P_2(A_1+A_2)$ and thus is the same as $F_5$. On the opposite side of the seal plate 56 at this time during the rotational cycle of the rotor assembly 12, an opening force $F_8$ is exerted against the seal plate, and is equivalent to $(P_2A_3/2)+(P_2A_4/2)$. As the port 76 and the island 78 which leads it in the direction of rotation of the rotor assembly 12 approach the high pressure distribution port 106, the island 78 first moves across the open upper end of the leg 114 of the bleed orifice 111 which extends from the leading end of the high pressure distribution port 106. The area of the opening at the upper end of the bleed orifice 111 is quite small, so that the force exerted upwardly upon the area of the island 78 which is passing directly over the bleed orifice at this time is also quite small and has an insignificant effect on the total magnitude of the opening force acting immediately prior to the time that the island passes across the bleed orifice 111.

After the island 78 has traversed the bleed orifice 111 which is in communication with the high pressure distribution port 106, the port 76 which trails this island commences to traverse the open upper end of the bleed orifice with the result that the liquid A at pressure $P_4$ which fills the high pressure distribution port 106, as heretofore explained, commences to bleed through the bleed orifice 111 into the port 76, and to increase the pressure within the port and its associated conduit-receiving recess 64 so as to increase the pressure acting upon areas $A_1$ and $A_2$. A build-up in pressure at this location commences at a time when the trailing edge B of the island 78, as shown by the dashed line B in FIG. 7, first begins to uncover the open upper end of the bleed orifice 111. The pressure increase continues until a point in time when the island 78 is well out over the high pressure distribution port 106 with its surface adjacent the stator block substantially entirely exposed to the liquid A at pressure $P_4$ in the high pressure distribution port.

Concurrently with the build-up or increase in the pressure exerted upon the areas $A_1$ and $A_2$ by liquid A contained within the recess 64 and the port 76 which is approaching the high pressure distribution port 106, there commences to occur, as the island 78 begins to move across and immediately over the high pressure distribution port, an increase in the opening force. This arises from a part $A_5$ of the surface of the island 78 which abuts the stator block being exposed to the liquid A at pressure $P_4$. Thus, that continually increasing area of the island 78 which is directly over the high pressure distribution port is acted upon by the pressure $P_4$ which is higher than the pressure $P_2$, and the separatory force acting against the seal plate 56 increases as the exposed area of the island 78 increases.

It will be perceived from the description that the increasing opening force tending to move the seal plate away from the stator block at this time is counteracted by the build-up in the pressure exerted against the areas $A_1$ and $A_2$ as a result of the pre-established communication which exists between the bleed orifice 111 and the port 76. The effect realized is, of course, the opposite of that which has been described as occurring at that time during the rotation of the rotor assembly 12 when a port 76 and the island 78 in advance of it approach the low pressure distribution port 104, and the port 76 is communicated with the low pressure distribution port 104 via the bleed orifice prior to the time that the island in advance of it begins to move over, and be subject to, the lower pressure $P_2$ of the liquid A contained in the low pressure distribution port.

The foregoing discussion has dealt with the changes in clamping and opening forces which act upon the seal plate 56 at the left end of the rotor assembly 12 as the rotor assembly undergoes rotation, and has made specific reference to the rotor bore tube 18 and the high and low pressure distribution ports 106 and 104, respectively. It will be understood that the same type of fluctuation in clamping and opening forces occurs in the case of the stator block 80 and seal plate 56 located at the right end of the apparatus, and not specifically illustrated in FIG. 1 of the drawings. This will be more fully understood and realized when it is recalled that the relatively high pressure liquid B is being charged through one of the distribution ports in the right stator block (that one which is longitudinally aligned with the high pressure distribution port 106 in the stator block 80 at the left end of the apparatus), and that the liquid B, at a substantially reduced or lower pressure, is then discharged from each rotor bore tube at a later time during rotation of the rotor assembly 12 as each rotor bore tube is brought into alignment with the low pressure distribution port formed in the right stator block. The low pressure distribution port in the stator block disposed at the right end of the apparatus is in longitudinal alignment with the low pressure distribution port 104 in the stator block at the left side of the apparatus.

The bleed orifices 111 which are illustrated have counterpart orifices associated in the same way with the high and low pressure distribution ports formed in the stator block at the right end of the apparatus, and the functions of all of the bleed orifices are the same. Thus, an approach toward force balancing to minimize the clamping force acting during rotation of the rotor is utilized in the case of the right stator block in the same way that it has been hereinbefore described as being employed during the rotation of the rotor assembly 12, and the cooperative sealing relationship of the seal plate 56 and the stator block 80 during such rotation.

It should be understood that it is possible, in other embodiments of the invention, to extend the bleed orifices to other external locations on the respective stator blocks and to there communicate the respective orifices with capillary tubes or the like connected into the respective high or low pressure conduits which are threadedly connected to the high and low pressure passageways 97 and 98.

From the foregoing description of the manner in which the bleed orifices 111 associated with the high and low pressure ports 104 and 106 function, it will be seen that the manner in which the seal plates 56 and stator blocks 80 are constructed facilitates a continuous and automatic near balancing of the separatory and clamping forces acting on opposite sides of the seal plate so as to minimize the drag imparted through the rotor assembly 12 to the prime mover which is used to drive it in rotation. The construction also alleviates sudden changes in the force differential acting across each of the seal plates in a manner which is destructive of the seal plate within a relatively short operating life of the apparatus.

Although the desirable function attributed to the orifices 111 has been described as occurring at such orifices as are provided at those ends of the fluid distribution ports which are oriented upstream in the sense of the direction of rotation of the rotor assembly 12 and its associated seal plates 56, such bleed orifices are also provided, in identical form, at the opposite ends of each of the fluid distribution ports in the stator blocks. This dual orifice construction enables the rotor assembly 12 to be optionally rotated in either direction, and more importantly, permits the stator blocks at opposite ends of the apparatus to be used interchangeably, and without concern for the need to select and appropriately attach a right-hand stator block and a left-hand stator block in accordance with the particular direction in which the rotor assembly 12 is to be rotated.

Another important aspect of the present invention is the manner in which the seal plates 56 are engaged with the rotor assembly 12. The floating character of the seal plates 56 has already been alluded to in the foregoing description. In this regard, it will be noted that no O-ring seals or similar resilient sealing members are provided at any location in either of the contacting bearing and sealing surfaces which cooperatively interact between each stator block-seal plate pair during operation of the apparatus. Only a single conventional annular O-ring seal is needed around each end of each of the rotor bore tubes at the location where it projects into its respective conduit receiving recess in a seal plate.

Moreover, the construction of the seals at this location, and the manner in which the several rotor bore tubes are fitted into their respective conduit-receiving recesses, is such that the seal plates can undergo some freedom of movement upon, and in relation to, the several rotor bore tubes. The fact that three rotor seal drive pins 40 are provided on 120° circumferential spacings from each other for the purpose of carrying the seal plates on the rotor assembly 12 is quite important, in that it permits free canting movement of the seal plates with respect to the axis of the shaft 30, and thus with respect to the several rotor bore tubes projected into each seal plate, without cocking or becoming engaged or clamped against any of these rotor bore tubes as a result of undergoing such movement. The described floating capability of the seal plates 56, coupled with the small static loading force exerted on the seal plates by the helical springs 72 assures that the raised annular bearing and sealing surface 74 carried on the side of each seal plate which faces the stator block 80 can be self-adjusting and self-compensating as it undergoes wear, particularly where such wear occurs in an uneven fashion around the entire annular sealing surface.

It should be further pointed out that we have found that the inclusion of an odd number, and preferably nine, of the equisized, equidistant arcuate peanut-shaped ports 76, as opposed to a different number of such ports, is an important factor in the evenness and smoothness with which the apparatus of the invention can be operated. All of the reasons for the advantage obtained through the use of nine of the ports 76, along with associated conduit-receiving recesses and rotor bore tubes, are not thoroughly understood. It is believed, however, that the fact that at any time during rotation of the rotor assembly 12, the same total number of the ports 76 or a fraction thereof, which is in communication with the high pressure distribution port 106 will be in communication with the low pressure distribution port 104, and that this number will be constant during each increment of the rotational cycle of the rotor assembly 12, assures that surging does not develop in the feed of the low and high pressure fluids to the assembly as the apparatus is used. This is so because the capacity for fluid flow via the high and low pressure distribution ports remains constant and unchanging at all times during operation. These results have not been realized when using a different number of the ports 76 and associated rotor bore tubes, although the device is still operable.

During the operation of the energy exchange apparatus, the port geometry and speed of rotor assembly rotation are selected so that the period of port communication and fluid charging to the rotor bore tubes is optimally correlated to the time of tube transit by the separatory member so as to maximize efficiency and minimize flow and pressure pulsations.

From the foregoing description of a preferred embodiment of the invention, it will be appreciated that changes and innovations of structure and mode of assembly can be effected at some locations without departure from the basic principles which underlie the invention, and without sacrifice of the advantageous and desirable results which have been described as attributable to the invention. Changes and innovations of this type which continue to rely upon such basic and underlying principles are therefore deemed to be circumscribed by the spirit and scope of the invention, except as the same may be necessarily limited by the appended claims or reasonable equivalents thereof. It will also be understood that although use of the invention in transferring pressure energy between liquids and slurries of differing pressure has been described by way of example, the principles of the invention are equally applicable to gases and mixtures of gases and liquids.

What is claimed is:

1. Apparatus for exchanging pressure energy between a fluid at a relatively high pressure and a fluid at a relatively low pressure, comprising:

a rotor assembly including:
   a plurality of spaced, substantially parallel fluid-conveying conduits;
   a movable, fluid-displaceable separatory member reciprocably disposed in each of said conduits and dividing each of said conduits into two compartments;
   means for retaining the positional relationship of said fluid-conveying conduits about a central rotational axis while permitting relative axial movement as between two or more of the conduits; and
   seal plate engaging means carried on said retaining means;
rotor seal plates positioned at opposite ends of the rotor assembly and each including:
   a first side having an annular sealing surface concentrically positioned about said rotational axis with a plurality of circumferentially spaced ports opening at said sealing surface and extending into said seal plate;
   a second side on the opposite side of said seal plate from said first side and having a plurality of conduit-receiving recesses each opening at said second side and extending into communication with one of said ports and each receiving an end of one of said conduits; and
   means for engaging the respective seal plate with said seal plate engaging means for keying said seal plates to said rotor assembly for mutual rotation therewith about a common central rotational axis;
stator blocks positioned adjacent each of said seal plates and each having:
   a first side in sealing contact with said annular sealing surface on the adjacent rotor seal plate, said first side of said stator block having at least two spaced ports therein disposed radially equidistantly from said common central rotational axis and spaced substantially the same radial distance therefrom as said ports in said seal plates whereby said ports in each stator block intermittently and periodically communicate with each of the ports in the seal plate in sealing contact therewith as said rotor assembly is rotated;
   means for communicating a fluid through said stator block to each of said stator block ports while maintaining the fluid passing to each of the stator block ports isolated from fluid passing to each of the other stator block ports; and
means for rotating said rotor assembly about said central rotational axis.

2. Apparatus for exchanging pressure energy as defined in claim 1 wherein said means for retaining the positional relationship of said fluid-conveying conduits about a central rotational axis comprises a plurality of spaced, disk-shaped drive plates each extending substantially normal to the longitudinal axes of said fluid-conveying conduits, and each having a plurality of spaced holes therethrough for receiving said fluid-conveying conduits loosely through said holes, said holes being spaced substantially equidistantly from said central rotational axis.

3. Apparatus as defined in claim 2 wherein said seal plate engaging means comprises a plurality of drive pins carried on each of said drive plates and extending toward one of said seal plates and into engagement with the engaging means of said one seal plate.

4. Apparatus as defined in claim 3 wherein the means for engaging the respective seal plate with said seal plate engaging means comprises pin recesses in the respective seal plate and engaging said drive pins.

5. Apparatus as defined in claim 4 wherein said rotor assembly further includes a drive shaft extending along said central rotational axis and having its opposite ends journalled in said stator blocks, and having said drive plates keyed thereto for rotation therewith.

6. Apparatus as defined in claim 5 wherein said means for rotating said rotor assembly about said central rotational axis comprises a rotor drive sprocket keyed to said drive shaft for rotation therewith, and having sprocket teeth positioned at the outer periphery thereof and holes spaced radially inwardly from said sprocket teeth for receiving and passing said fluid-conveying conduits.

7. Apparatus for exchanging pressure energy as defined in claim 1 wherein said seal plate engaging means comprises a plurality of spaced rotor drive pins carried on said retaining means, and located at positions thereon equidistant from said central rotational axis, said drive pins each extending toward one of said seal plates from said retaining means and in a direction substantially parallel to said central rotational axis.

8. Apparatus as defined in claim 1 and further characterized as including bleed orifices in each of said stator blocks and each associated with one of said stator block ports, each of said bleed orifices including:
   a first leg within said respective stator block and extending substantially parallel to said first side of the respective stator block and parallel to the annular sealing surface on the respective adjacent rotor seal plate, said first leg communicating at one end with the respective adjacent stator block port with which its bleed orifice is associated; and
   a second leg extending substantially normal to said first leg and having one end communicating with said first leg and a second end opening at said first side of the respective stator block in which it is located, and opening at a position in said first side of the respective stator block to register and communicate with the ports in the respective adjacent seal plate as said rotor assembly is rotated.

9. Apparatus as defined in claim 8 wherein the length of said first leg and the distance separating said second leg from said adjacent stator block port is substantially equal to the distance separating said circumferentially spaced ports in the first sides of said seal plates.

10. Apparatus as defined in claim 9 wherein said rotor assembly includes nine of said fluid-conveying conduits; and
   wherein each of said ports opening at the sealing surface of each seal plate is of arcuate, peanut-shaped configuration; and
   wherein the relative dimensional sizes of said last-mentioned ports and said stator block ports are such that three of said arcuate, peanut-shaped ports can concurrently register and communicate with one of said stator block ports.

11. Apparatus as defined in claim 10 and further characterized as including means between the ends of each of said fluid-conveying conduits and the seal plates receiving said fluid-conveying conduit ends resiliently biasing each of said seal plates toward the respective stator block positioned adjacent the respective seal plate.

12. Apparatus as defined in claim 11 wherein said means for retaining the positional relationship of said fluid-conveying conduits about a central rotational axis comprises a plurality of spaced, disk-shaped drive plates each extending substantially normal to the longitudinal axes of said fluid-conveying conduits, and each having a plurality of spaced holes therethrough for receiving said fluid-conveying conduits loosely through said holes, said holes being spaced substantially equidistantly from said central rotational axis.

13. Apparatus as defined in claim 12 wherein said seal plate engaging means comprises a plurality of drive pins carried on each of said drive plates and extending toward one of said seal plates and into engagement with the engaging means of said one seal plate.

14. Apparatus as defined in claim 13 wherein the means for engaging the respective seal plate with said seal plate engaging means comprises pin recesses in the respective seal plate and engaging said drive pins.

15. Apparatus for exchanging pressure energy as defined in claim 1 wherein said means for communicating a fluid through said stator block to each of said stator block ports comprises a pair of spaced, internally threaded fluid passageways opening into said stator block at the side thereof opposite said first side, and each communicating with a different one of said stator block ports from the other.

16. Apparatus for exchanging pressure energy as defined in claim 1 wherein said seal plate engaging means and last recited means for engaging the respective seal plate with said seal plate engaging means cooperate to facilitate canting movement by each of said seal plates, by which movement the respective seal plate becomes angled out of a plane extending normal to said common central rotational axis.

17. Apparatus for exchanging pressure energy as defined in claim 1 and further characterized as including means between the ends of each of said fluid-conveying conduits and the seal plates receiving said fluid-conveying conduit ends resiliently biasing each of said seal plates toward the respective stator block positioned adjacent the respective seal plate.

18. Apparatus for exchanging pressure energy as defined in claim 1 wherein said rotor assembly further includes a drive shaft extending along said central rotational axis and having its opposite ends journaled in said stator blocks, said drive shaft drivingly engaging said positioned relationship retaining means.

19. Apparatus as defined in claim 18 wherein said means for rotating said rotor assembly about said central rotational axis comprises a rotor drive sprocket keyed to said drive shaft for rotation therewith, and having sprocket teeth positioned at the outer periphery thereof and holes spaced radially inwardly from said sprocket teeth for receiving and passing said fluid-conveying conduits.

20. Apparatus for exchanging pressure energy as defined in claim 1 wherein said rotor assembly includes nine of said fluid-conveying conduits; and
   wherein each of said ports opening at the sealing surface of each seal plate is of arcuate, peanut-shaped configuration; and
   wherein the relative dimensional sizes of said last-mentioned ports and said stator block ports are such that three of said arcuate, peanut-shaped ports can concurrently register and communicate with one of said stator block ports.

21. Apparatus for exchanging energy between a pressurized liquid and a liquid or slurry at a different pressure comprising:

a plurality of substantially parallel tubular members interconnected for concurrent rotation about a rotational axis disposed centrally therebetween and extending substantially parallel thereto;

a movable, fluid-displaceable separatory member reciprocably disposed in each of said tubular members and dividing each of said members into two compartments;

seal plates disposed at opposite ends of said tubular members and each floatingly engaged with said tubular members for canting movement on said tubular members as the respective seal plate changes its angulation in relation to said rotational axis, and for free movement toward and away from said tubular members in the direction of the longitudinal axes of said tubular members, said seal plates being connected to said tubular members for rotation therewith about said rotational axis, and each of said seal plates having a plurality of fluid passageway means therethrough each positioned in alignment with, and communicating with, one of said tubular members;

a stator block sealingly contacting each of said seal plates during rotation of said tubular members and seal plates, each of said stator blocks being positioned adjacent one of said seal plates and on the oppposite side of said one seal plate from said tubular members, each of said stator blocks having a plurality of fluid passageway means therethrough positioned for intermittent and periodic registration and communication with each of the several fluid passageway means in the adjacent seal plate as said seal plates and tubular members undergo rotation; and means for rotating said tubular members and seal plates about said rotational axis.

22. Apparatus as defined in claim 21 and further characterized as including means for individually pre-communicating each of the fluid passageway means in the stator block with each one of the fluid passageway means in the respective adjacent seal plate immediately prior to the time that the last-mentioned one fluid passageway means is in registration with a fluid passageway means in said stator block.

23. In an apparatus for elevating the pressure of a first liquid by means of a second liquid at a higher pressure, which apparatus includes (a) a plurality of elongated, mutually rotatable fluid pressure transfer passageways rotatable about a common, centrally disposed axis, and (b) stationary, non-rotating means from and into which said passageways each alternately respectively receive and transfer liquid at alternately high and low pressures at at least two different locations at each of the opposite ends of each of the passageways, the improvement which comprises:

seal plates floatingly disposed at opposite ends of the several passageways and disposed between the passageway ends and said stationary non-rotating means, said seal plates each being sealingly engaged with, and surrounding, the end portions of each of the passageways and each being shiftable longitudinally of the passageways and to randomly varying distances along the several passageways while continuing to surround the end portion of each of said passageways; and means resiliently urging the seal plates into sealing engagement with said stationary non-rotating means, said seal plates each further including openings through the respective seal plate to permit liquid movement between said passageways and said stationary, non-rotating means when each of said passageways rotates into a predetermined position relative to said stationary, non-rotating means, each of said seal plate openings slidably receiving an end portion of one of said passageways.

24. Apparatus for pressure communicating two fluids comprising:

a rotary assembly including:
  a plurality of spaced, substantially parallel conduits;
  means reciprocably disposed in each of said conduits and dividing each of said conduits into compartments; and
  means for supporting said conduits for rotation about a central rotational axis while permitting relative axial movement as between at least two of said conduits;

a rotor seal plate positioned at an end of the rotor assembly and including:
  a first side having a sealing surface concentrically positioned about said rotational axis with a plurality of circumferentially spaced ports opening at said sealing surface and extending into said seal plate;
  a second side at the opposite side of said seal plate from said first side and having a plurality of conduit-receiving recesses each opening at said second side and extending into communication with one of said ports and each receiving an end of one of said conduits; and
  means for engaging the seal plate with said supporting means for keying said seal plate to said rotor assembly for mutual rotation therewith about a common central rotational axis;

a stator block positioned adjacent said seal plate and having:
  a first side sealingly oriented with respect to said sealing surface of the seal plate, said first side of said stator block having at least two spaced ports therein spaced radially from said common central rotational axis and positioned for intermittent and periodic registry and communication with each of the ports in said seal plate as said rotor assembly is rotated, and said first side further having bleed orifices therein, each of said bleed orifices extending to a point of intersection with one of the spaced ports in said first side of the stator block and positioned to precommunicate said one port with one of the ports in said seal plate before said one seal plate port is aligned and in registry with said one port in said stator block;
  means for communicating a fluid through said stator block to each of said stator block ports while maintaining the fluid passing to each of the stator block ports isolated from fluid passing to each of the other stator block ports; and means for rotating the rotor assembly about said central rotational axis.

* * * * *